July 5, 1938. F. STEBLER 2,122,542
CONVEYER BELT FOR FRUIT SIZING MACHINES
Filed Nov. 5, 1935
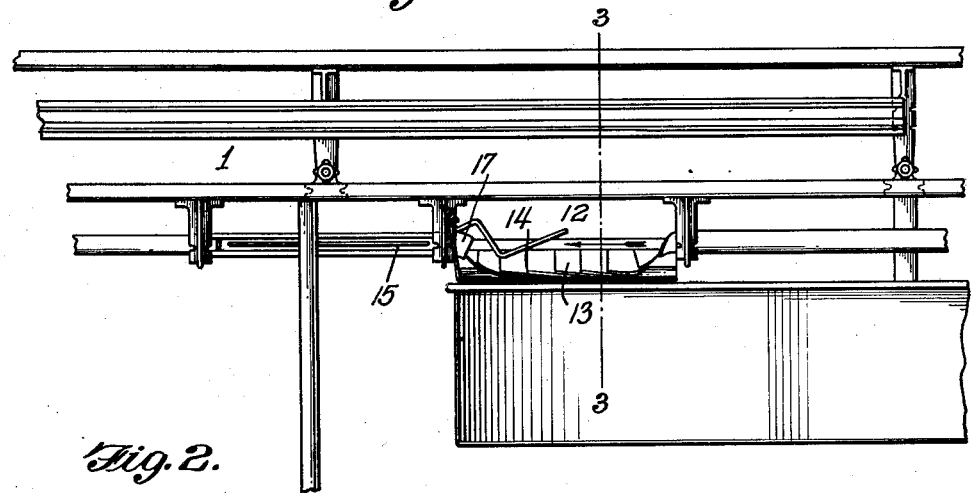
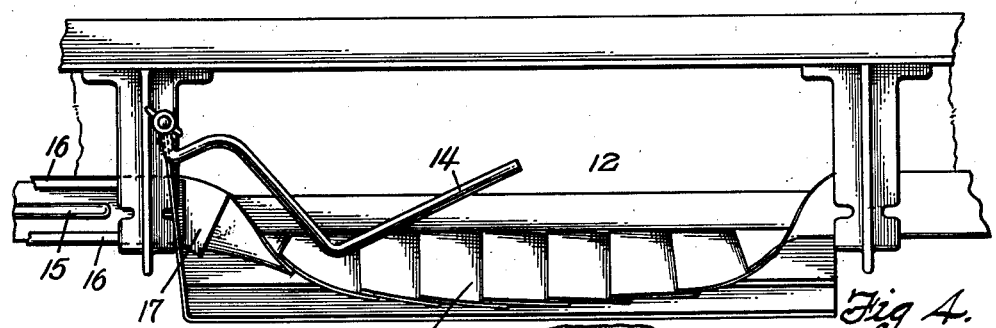
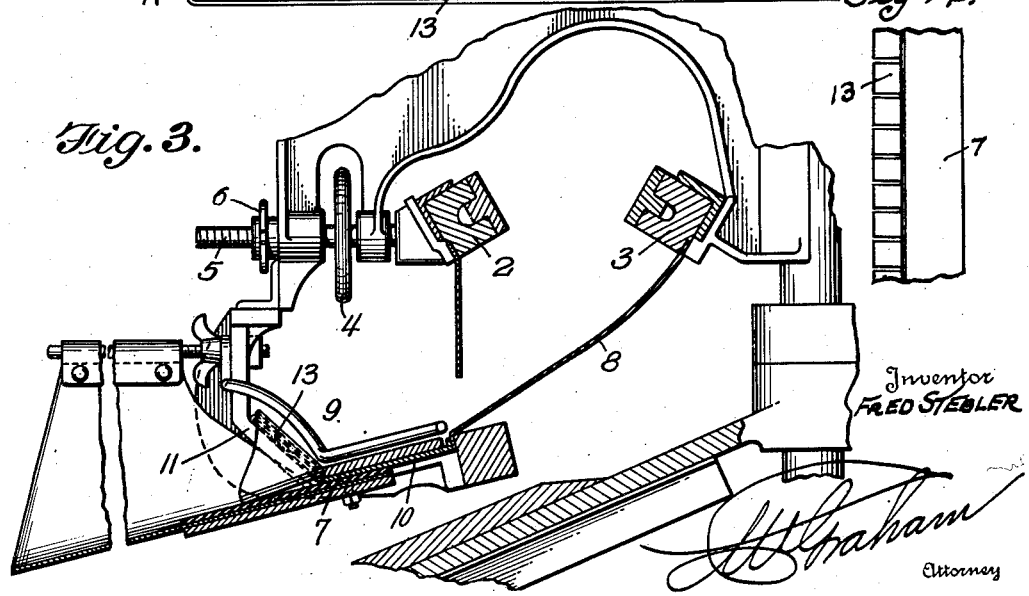
Inventor
FRED STEBLER
Attorney Patented July 5, 1938

2,122,542

UNITED STATES PATENT OFFICE 2,122,542

CONVEYER BELT FOR FRUIT SIZING MACHINES

Fred Stebler, Riverside, Calif., assignor to Food Machinery Corporation, San Jose, Calif., a corporation of Delaware Application November 5, 1935, Serial No. 48,392

5 Claims. (Cl. 198—187)

This invention relates to a conveyer belt for use in connection with fruit sizers and the like for conveying the fruit as it comes from the sizer and distribute it to bins.

In apparatus of this sort the fruit has usually been discharged from the sizer onto a trough shaped device which had a flat belt lying along one side of the trough to move the fruit therealong while it would roll along the other edge or wall of the trough.

This arrangement has been generally satisfactory except that when delicate skinned fruit has been handled it has been found that the skins became more or less abraded as they rolled against the fixed wall of the trough, and were thereby more or less damaged and sometimes unfit for shipment over long stretches.

The conveyer belt comprising this invention comprises a belt of special construction wherein it is adapted to hinge along its median line and form a complete trough with both sides moving so that the fruit is completely carried by the belt and does not come in contact with the fixed walls of the trough at all.

To further adapt this belt to the handling of the fruit that comes from a sizer and to aid in the distribution of the fruit to the several bins, one side of the belt along the median hinge is made of overlapping sections to render it completely flexible and capable of moving from an inclined position forming one side of a trough, to a flat position adjacent a bin to permit of discharging the fruit sidewise from the belt into the bin. This construction and arrangement makes the device a combined conveyer and discharge medium without any additional or attending device except a gateway or opening in the side of the fixed trough to permit the flexible side of the belt to drop into a flat position while passing that point and thus permit the fruit to roll laterally off the belt.

In order to insure each fruit rolling off the belt at the desired point a sweep is provided to be adjusted angularly across the belt and thus sweep the fruit off if for any reason it should hesitate.

There is also provided a sliding door or section of the side wall of the fixed trough, at various intervals along the trough so that an opening for the discharge of fruit into any desired bin may be made.

It is therefore an object of the invention to provide a conveyer for the purpose specified that is a combined conveyer and discharge device.

It is also an object of the invention to provide a conveyer for handling fruit and the like having a hinge along the median line thereof.

It is also an object to provide a conveyer belt for the purpose wherein one section of the belt on one side of the median line is made sectional so that this side will have greater flexibility.

It is a further object of the invention to provide a belt for the conveying of fruit and the like that is adapted to form a moving trough in which the fruit rests and is wholly conveyed to the place of disposal.

It is also an object of the invention to provide a belt for the purpose specified that will move continuously to convey the fruit and that will assume a discharging position at a discharge station without changing or retarding the movement of the belt.

It is also an object of the invention to provide an apparatus for handling fruit as it comes from sizing machine wherein is employed a belt member for conveying the fruit and having a section on one side of a median line capable of flexing from a normal operative position to that of a discharging position without affecting the movement of the belt.

It is a further object of the invention to provide an apparatus for handling fruit coming from a sizing machine wherein a conveyer belt is employed for moving the fruit and which is capable of flexing to permit the fruit to discharge laterally therefrom and having a sliding door or section to limit the discharge opening or to close it completely.

Other objects and advantages that have not been enumerated will become apparent as the description proceeds and applicant wishes it understood that he considers himself entitled to any and all changes that are possible in the apparatus that will fall within the scope and meaning of the claims.

The drawing accompanying this application is more or less diagrammatic in character and shows only a portion of the full machine or apparatus with which the improved conveyer is used, it is not necessarily drawn to scale and some of the parts may be more or less exaggerated to more clearly show the application of the invention to a commercial apparatus.

Figure 1 is a side elevation of a portion of an apparatus embodying the invention and shows one of the discharge stations with the flexible portion of the belt deflected downward so that the product will be swept off the belt into a positioned bin or other suitable receptacle.

Figure 2 is an enlarged detail of that portion of the apparatus directly at a discharge station and shows the details of construction more clearly than the smaller view.

Figure 3 is a transverse section of the apparatus taken on substantially the line 3—3 of Figure 1 and shows the location and operative arrangement of the improved conveyer belt in relation to the other parts of the apparatus.

Figure 4 is a detail view showing a modification of the belt construction.

Figure 1 shows only a portion of a sizing machine embodying this invention and in this figure is shown only one lateral opening, it being understood that as many side discharge openings may be provided as are necessary for the work in hand and to take care of as many graded sizes as are necessary for the proper grading of the product being handled.

The sizer generally is designated by the numeral 1 and comprises a sizing runway consisting of the rails 2 and 3, the rail 2 having lateral adjustment relative to the rail 3 so as to graduate the opening therebetween and thus drop the different sized fruits in closely predetermined points or stations along the runway. The lateral adjustment of the rail 2 is accomplished by means of the hand wheels 4, the screw 5 and the lock nut 6. Directly under the sizing runway there is a flexible apron on which the product drops and is guided to the conveyer distributor belt 7, the apron being numbered 8. The sizing runway and the distributor belt of course extend the full length of the machine and the product is dropped through the sizing runway at predetermined intervals, according to the number of grades desired.

A fixed trough is provided as at 9 comprising the inclined base member 10 which the product first encounters as it rolls from the sizing runway. Joining this base member 10 is an inclined back member 11 completing the fixed trough.

The distributor belt 7 rides in the fixed trough, the solid portion riding along the base member 10 and the flexible portion riding along the inclined back member 11. This arrangement provides a constantly moving trough for the product so that it is conveyed and distributed without rubbing against any fixed portion of the distributor system, therefore the product is not in any manner abraded or bruised by rolling over the surface of fixed troughs or the like.

Along the line of travel of the distributor conveyer are placed openings 12 which are made by either cutting away the side of the inclined trough member 11 or by bending the member 11 downward to form a lateral opening in the side thereof. This opening is formed with curved ends so that the flexible portion 13 of the distributor belt 7 will flex and follow the contour of the openings, thus permitting the product to roll over the flexible portion of the conveyer belt and drop into a positioned bin or other receptacle.

To assure the fruit or other product rolling off the distributor belt when it reaches the desired opening a sweep device 14 is adjusted to overlie the top surface of the belt and force the product to roll off the belt through the side opening.

If it is desired to close an opening so as to deliver the product to some other place along the line a gate 15 is provided that slides through suitable guides 16, the slide having a rounded end 17 rides under the flexible side of the belt and lifts it up to its normal position between discharging stations.

In the construction of this distributor belt a main section 7 is made like an ordinary belt of laminations of canvas and stitched, the flexible portion may be made in several ways. One way would be to take a narrower belt than the main belt and secure it to the main belt to form a median hinge lengthwise of the two belts and then cut the narrower belt into sections to give it flexibility, the sections might be four or five inches in width with abutting edges, the cut of course running from the outer edge to the median hinge line.

Another way, and the one shown in the drawing comprises making the main belt as before of canvas laminations stitched together and then securing flaps to the edge of the main belt with their edges overlapping so that as the belt flexes on going around a curve the flaps slide over each other and always present an unbroken surface for the product to roll over.

*Operation*

The operation of the device is so apparent from a study of the drawing and specification that a special description seems unnecessary.

Fruit or other product rolling down the runways 2 and 3 will drop along the runway according to its size and fall onto the apron 8 which guides it down to the belt surfaces 7 and 13, which surfaces are moving continuously. When the product lands in the trough formed by the moving belt sections 7 and 13 it is immediately conveyed along in the direction the belt is moving and when it comes to a side opening and the sweep 14 is adjusted over the belt, the product will be swept from the belt when it will roll into a positioned bin or container, or if it is to be placed or disposed of at some other point along the line and the regular side opening is closed the conveyor belt will carry it until an opening is reached for its discharge.

When it is desired to close any side discharge opening the gate 15 is pushed up through the opening which raises the flexible portion of the belt 13 up into its normal position and causes the product to be carried past that station.

When a discharge station is closed by the gate 15 the sweep 14 is swung up out of the way of the inclined belt so there will be no interference.

No power means is shown for moving the distributor belt since this is a part of the main machine and comprises simply suitable pulleys of a well known type and construction, driven in any suitable manner.

As has been mentioned, the belt may be made in several alternative methods and in Figure 4 is shown a slightly different construction, wherein the serrated edge is produced by hinging small flaps to the main belt and having a small space between flaps. This construction in some instances is preferable to that shown in the other views. Applicant therefore, does not wish to limit himself wholly to either construction shown but considers any structure having a flexible edge belt which will flex to accommodate any position during the conveying operation as falling within the scope and meaning of the claims.

What I claim as new and desire to secure by Letters Patent is:

1. Conveying means for a fruit sizer or the like, comprising an endless flexible belt, a series of short width flaps hingedly secured along an edge thereof to provide a flexible fruit support along a side of said conveying means which will readily move to a fruit discharging position under its own weight, and guide means for supporting said belt and said flaps and for controlling the angular position of said flaps relative to said belt, said guide means including a continuous surface for supporting said flaps to maintain raised positions thereof for fruit conveying operation and to allow movement of said flaps to a lowered position thereof for fruit discharging operation, the relation between the length of the discharge controlling portion of said surface and the width of said flaps being such that only a small number of flaps can be in lowered position on said discharge controlling portion.

2. Conveying means for a fruit sizer or the like, comprising an endless flexible belt, a series of flaps hingedly secured along an edge thereof to provide a flexible fruit support along a side of said conveyer means which will readily move to a fruit discharging position under its own weight, said flaps having a dimension at right angles to the direction of travel of the belt less than the width of said belt and a transverse dimension of substantially the same order, and guide means for supporting said belt and said flaps and for controlling the angular position of said flaps relative to said belt, said guide means including a continuous surface for supporting said flaps to maintain raised positions thereof for fruit conveying operation and to allow movement of said flaps to a lowered position thereof for fruit discharging operation, the relation between the length of the discharge controlling portion of said surface and the width of said flaps being such that only a small number of flaps can be in a lowered position on said discharge controlling portion.

3. In a fruit sizing machine a conveyer belt comprising a flat endless section and a series of flaps hingedly secured to an edge thereof, guide means along which said belt travels and positioned to hold said flaps in angular relation thereto to form a conveying trough into which fruit rolls from the sizing machine, gates along said guide means for producing openings of variable width for the discharge of fruit from said trough, the opening of said gates permitting the flaps on said belt to flex downward and permit the conveyed fruit to roll transversely thereof into a suitable receptacle.

4. In a fruit sizing machine a conveyor means comprising a flat endless portion and a series of separate flaps secured to an edge of said endless portion and having radial movement relative thereto, guide means for converting said conveyer into a trough shaped receptacle for receiving and moving fruit as it rolls from said sizing machine, discharge stations along the path of travel of said conveyer and means at said stations for removing the supports for said flaps and permitting them to flex downward, a sweep device lying across the surface of the conveyer at the discharge station to insure the removal of the fruit from said conveyer.

5. In a fruit sizing machine a conveyer means comprising a trough shaped endless device an edge of which is composed of flaps having radial movement relative thereto, a trough shaped guide means in which said conveyer moves and wherein it forms a complete support for fruit being conveyed, discharge stations along said trough shaped guide means, movable gates at said stations for effecting discharge of fruit therefrom at will, the opening of said gates permitting the flap portion of said conveyer to flex downward and the fruit to roll transversely thereof into a suitable receptacle.

FRED STEBLER.